United States Patent [19]
Alleaume et al.

[11] 3,771,342
[45] Nov. 13, 1973

[54] METHOD FOR MANUFACTURING A CORRUGATED CORNER PIECE OR THE LIKE

[75] Inventors: Jean H. Alleaume, Saint-Cloud; Gilbert C. F. Fournier, Le Havre, both of France

[73] Assignee: Technigaz, Paris, France

[22] Filed: Oct. 15, 1971

[21] Appl. No.: 189,574

Related U.S. Application Data
[62] Division of Ser. No. 842,482, July 17, 1969, Pat. No. 3,686,920.

[30] Foreign Application Priority Data
Dec. 31, 1968 France .............................. 68182929

[52] U.S. Cl. .................................................. 72/379
[51] Int. Cl. ........................................... B21d 13/02
[58] Field of Search ....................... 72/379; 52/276; 220/9 LG; 114/74 A

[56] References Cited
UNITED STATES PATENTS

| | | | |
|---|---|---|---|
| 3,321,881 | 5/1967 | Alleaume | 52/276 |
| 3,325,953 | 6/1967 | Alleaume | 52/276 |
| 3,343,397 | 9/1967 | Fournier | 72/379 |
| 3,351,441 | 11/1967 | Gewiss | 72/379 |
| 3,395,505 | 8/1968 | Lamy | 72/276 |

*Primary Examiner*—Charles W. Lanham
*Assistant Examiner*—Gene P. Crosby
*Attorney*—Nolte & Nolte

[57] ABSTRACT

A method of making a dihedron-like corrugated corner element from a metal sheet, comprising folding said sheet into a dihedron and forming therein a corrugation extending throughout transversely of the edge of the dihedron by driving in a portion of said sheet while simultaneously drawing near to each other the non-deformed sheet portions located on each side of the crest folding line of the corrugations.

3 Claims, 3 Drawing Figures

Fig. 3.

METHOD FOR MANUFACTURING A CORRUGATED CORNER PIECE OR THE LIKE

Ser. is a division of the copending U.S. patent application er. No. 842,482 filed on July 17, 1969, now U.S. Pat. No. 3,686,920.

The present invention relates to and has essentially for its object a method of manufacturing or shaping a corrugated, pleated, or ribbed solid corner piece, generally in the shape of a dihedron or the like and of the kind disclosed in the copending divisional U.S. patent application Ser. No. 174,748 filed on Aug. 25, 1971, now abandoned, as well as the various applications and uses resulting from the working thereof.

In said copending divisional U.S. patent application has been described and shown a one-piece corrugated corner element generally in the shape of a dihedron formed of sheet metal and comprising at least one corrugation projecting on the internal side and on each face of the dihedral angle, in the form of a convex folded rib at least approximately dihedral, extending in a longitudinal direction substantially at right angles to the edge of said dihedron and having a uniform cross-section substantially symmetrical with respect to a plane extending at right angles to the edge of said dihedron and containing the respective crest lines of the two corrugations of the two adjacent faces of the dihedron. The concave-fold lines at the base of each said corrugation extend to the edge of said dihedron, where they meet the homologous lines of the other corrugation and each corrugation crest line divides at its end on the one hand into two diverging lateral convex-fold lines joining respectively the edge of said dihedron at the corresponding points of concurrence of said concave-fold base lines, on either side of the corrugation and, on the other hand, into a central concave-fold line which divides at its re-entrant end on the one hand into two diverging lateral concave-fold lines joining respectively said points of concurrence and, on the other hand, into a medial convex-fold line interconnecting the respective re-entrant ends of the two mutually confronting corrugations, so as to define adjacent triangular facets forming a common skew polyhedral surface of connection and transition between the two corrugations, the general geometrical configuration being preferably developable in a plane.

Each base face or wall of the aforesaid dihedron is substantially plane and the aforesaid corrugations are substantially rectilinear and preferably substantially symmetrical with respect to the bisecting plane of said dihedron.

Moreover, on the external side of the aforesaid dihedron there is no projection and no protuberance of material beyond the external surface of the wall of the said dihedron and the value of the dihedral angle is preferably within a range of from 60° to 180°.

The intermediate projecting dihedral portion interconnecting the said two corrugations is provided at its center with a depression in its crest at least approximately dihedral extending transversely of the said portion over at least part of the height thereof.

Hitherto a method of manufacturing or shaping the aforesaid corner piece, made for instance from sheet metal, comprises the steps of shaping said sheet metal by pure folding substantially without any elongation of the material, carried out by driving in a portion of the sheet metal, attended simultaneously by a concomitant free motion towards each other of the non-deformed portions or layers of sheet metal located on either side of the folding line, transversely of the latter, by an amount determined by the portion driven in. The method according to the invention provides an improvement over the state of the art in that it consists in first forming the aforesaid dihedron by means of a previous folding operation and then in carrying out, in a single operation, the forming of the aforesaid corrugations and of their common connecting surface.

The invention will be better understood and other objects, characteristics, details and advantages thereof will appear as the following explanatory description proceeds with reference to the accompanying diagrammatic drawings illustrating the corner piece disclosed in the aforesaid copending divisional U.S. patent application and wherein:

Figure 3:
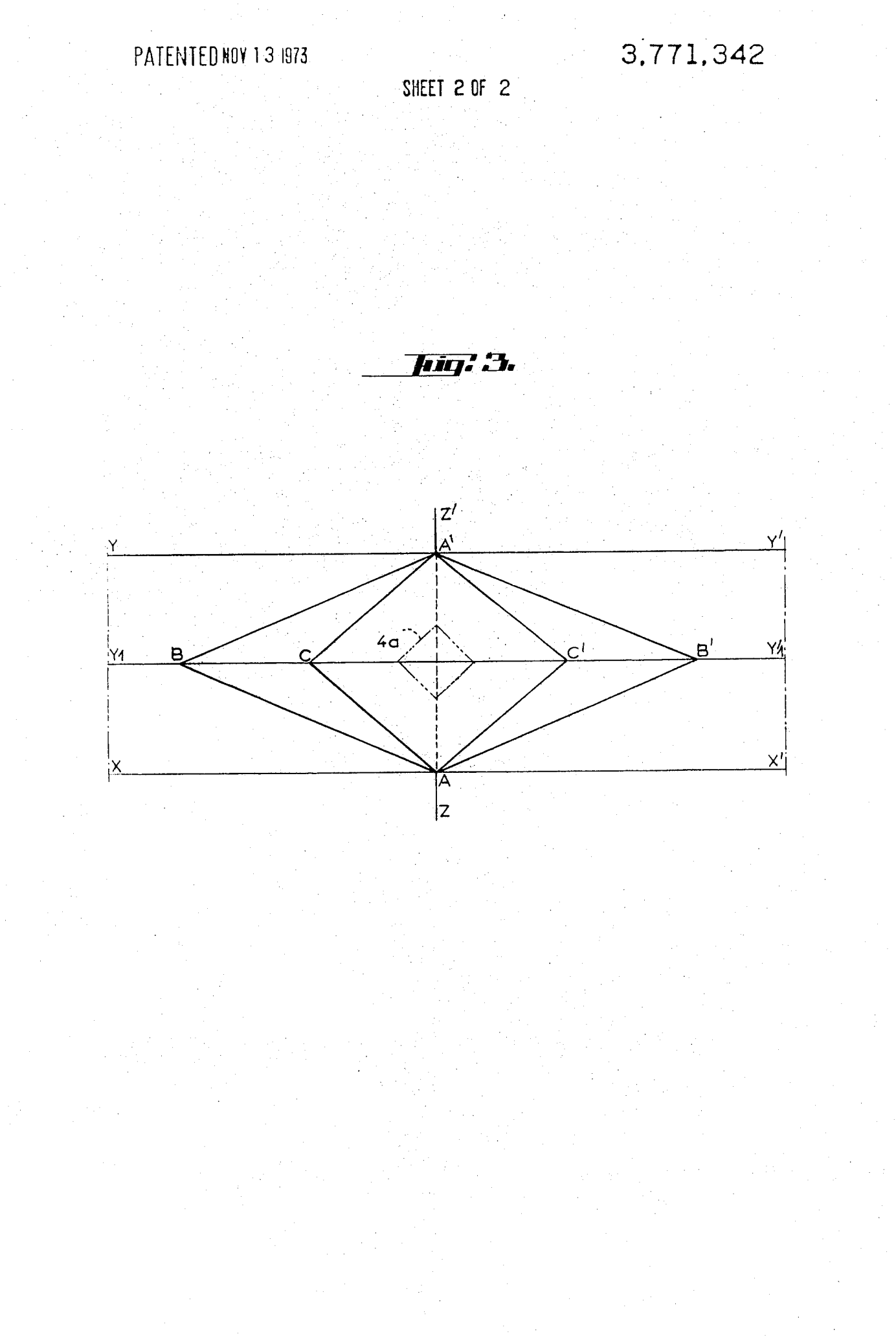

FIG. 3 is a diagrammatic view of the piece of FIG. 2 developed in a single plane showing the various folding lines.

Figures 1, 2:
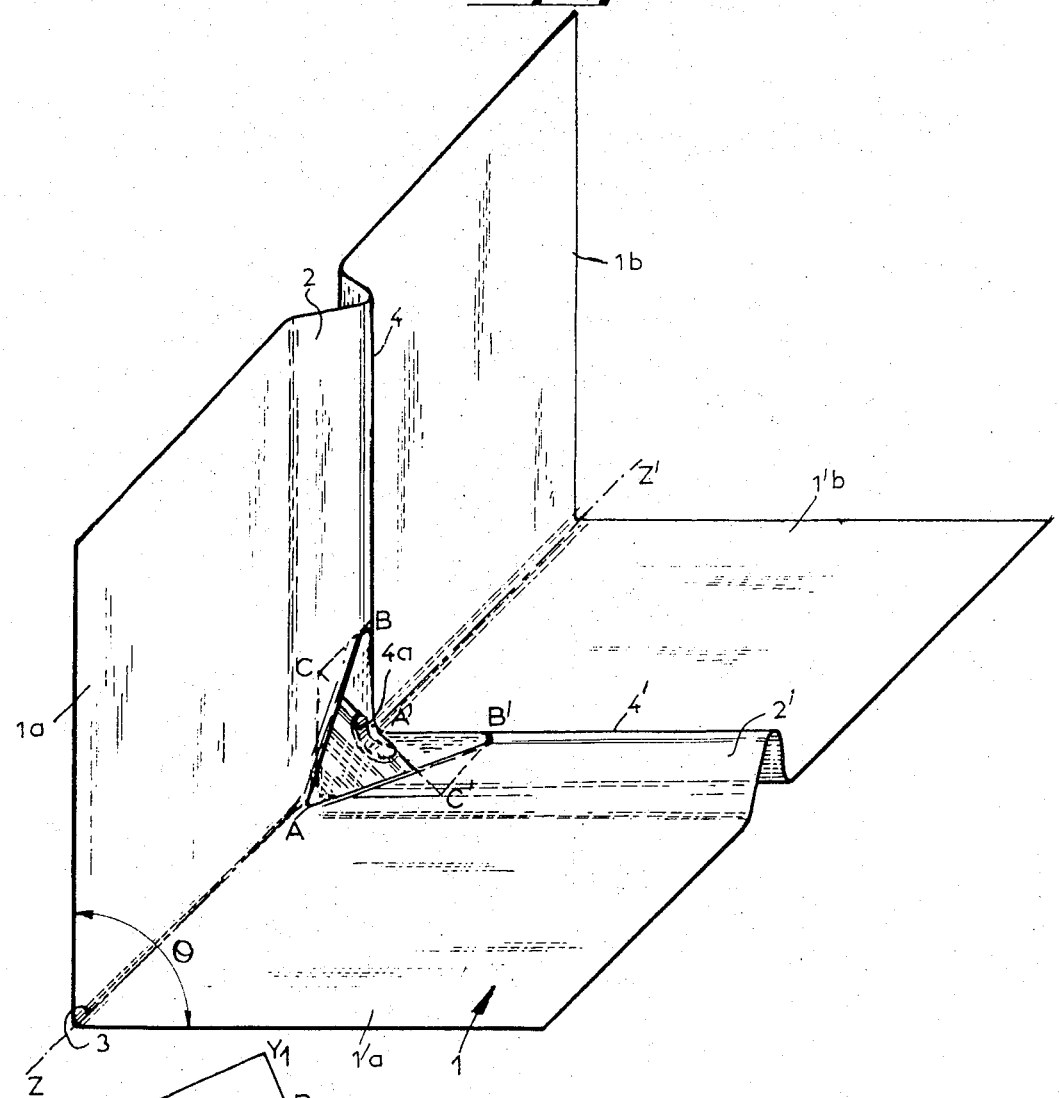
FIG. 1 is a perspective view of the corner piece to be made by the method according to the invention, the dihedral angle of which forms substantially a right angle.
FIG. 2 is a diagrammatic profile or side view of a corner piece with an obtuse dihedral angle.

Since the corner piece shown in the drawing has already been fully described in the aforesaid divisional patent application, it need not be described again or further herein.

According to the invention, the method of manufacturing the corner piece 1 from a metal sheet for example comprises shaping said sheet metal by pure folding or bending without any elongation or strain of the material. Said folding is carried out by driving in a portion of the metal sheet to form the corrugations or flutes 2, 2' while simultaneously freely moving towards each other in the direction of the straight line Z-Z' or 3 those non-deformed portions $1a$, $1b$, $1'a$, $1'b$ of the metal sheet which are located on either side of the folding, crest or ridge line 4, 4', transversely of the latter, by an amount determined by the depth or raised height of the driven in portion.

A significant feature of the process according to the invention consists in first forming the dihedron having an angle $\theta$ by means of a previous folding operation whereby the sheet 1 is bent about the axis Z-Z' and then in carrying out, in a single step, the forming of the corrugations 2, 2' and of their common connecting surface ABCA'B'C'.

A compression or contraction effort is exerted on said metal sheet 1 substantially in the plane of the sheet and in parallel relation to the edge line 3 of said dihedron in order to promote a combined shortening of the metal sheet 1 and the formation of the corregations 4,4'.

Finally a substantially central imprint, hollow or depression $4a$ of approximately dihedral shape is impressed subsequently in the intermediate projecting dihedral crest portion CC' interconnecting both waves 2, 2'.

The corner piece obtained may also be subjected to a further deformation in order to modify the shape of the wave obtained on each face or half-plane of the dihedron. This deformation may be the same for both half-planes or faces or alternatively, may be different when it is required to interconnect waves of unequal magnitude located in different planes.

It is to be understood that the invention should not be construed as limited to the embodiments described and shown which have been given by way of illustration only, as many modifications and alterations may be resorted to by those skilled in or conversant with the art without departing from the gist or scope of the invention. In particular it comprises all the means forming technical equivalents to the means described as well as their combinations, if they are carried out or put into practice according to the spirit, principles and teachings of the invention as defined in the appended claims.

What is claimed is:

1. A method of making a dihedron-like corrugated corner element of the character described from a sheet of material, comprising the steps of previously forming said dihedron by means of a folding operation, and then carrying out in a single step, the shaping of at least one pair of inward projecting mutually registering corrugations extending transversely of and meeting on the edge line of said dihedron and the simultaneous shaping of a common surface interconnecting said corrugations endwise.

2. A method according to claim 1, wherein a compression effort is exerted simultaneously upon the said sheet, substantially in the plane of the sheet and transversely of the direction of the said corrugations i.e. in parallel relation to the edge of the said dihedron in order to promote a corresponding shortening of said sheet.

3. A method according to claim 2, wherein subsequently a depression is impressed in an intermediate projecting dihedral portion of said common surface interconnecting said corrugations endwise.

* * * * *